US009135044B2

(12) United States Patent
Maharana (10) Patent No.: US 9,135,044 B2
(45) Date of Patent: Sep. 15, 2015

(54) VIRTUAL FUNCTION BOOT IN MULTI-ROOT I/O VIRTUALIZATION ENVIRONMENTS TO ENABLE MULTIPLE SERVERS TO SHARE VIRTUAL FUNCTIONS OF A STORAGE ADAPTER THROUGH A MR-IOV SWITCH

(75) Inventor: Parag R. Maharana, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 658 days.

(21) Appl. No.: 13/267,646

(22) Filed: Oct. 6, 2011

(65) Prior Publication Data

US 2012/0102491 A1    Apr. 26, 2012

Related U.S. Application Data

(60) Provisional application No. 61/406,601, filed on Oct. 26, 2010.

(51) Int. Cl.
G06F 9/455    (2006.01)
G06F 3/06    (2006.01)

(52) U.S. Cl.
CPC .......... *G06F 9/45558* (2013.01); *G06F 3/0689* (2013.01); *G06F 2009/45579* (2013.01)

(58) Field of Classification Search
CPC   G06F 9/5077; G06F 9/45533; G06F 9/45558
USPC ........................................................... 713/2
See application file for complete search history.

(56) References Cited

U.S. PATENT DOCUMENTS

| | | | |
|---|---|---|---|
| 2009/0133028 A1* | 5/2009 | Brown et al. | 718/104 |
| 2009/0276773 A1* | 11/2009 | Brown et al. | 718/1 |
| 2009/0313391 A1* | 12/2009 | Watanabe | 710/8 |
| 2010/0082874 A1* | 4/2010 | Baba et al. | 710/316 |
| 2010/0115329 A1* | 5/2010 | Tanaka et al. | 714/5 |
| 2010/0165874 A1* | 7/2010 | Brown et al. | 370/254 |
| 2011/0179414 A1* | 7/2011 | Goggin et al. | 718/1 |

* cited by examiner

*Primary Examiner* — Thomas Lee
*Assistant Examiner* — Zhipeng Wang
(74) *Attorney, Agent, or Firm* — Suiter Swantz pc llo (57) ABSTRACT

A method for virtual function boot in a system including a single-root I/O virtualization (SR-IOV) enabled server includes loading a PF driver of the PF of a storage adapter onto the server utilizing the virtual machine manager of the server; creating a plurality of virtual functions utilizing the PF driver, detecting each of the virtual functions on an interconnection bus, maintaining a boot list associated with the plurality of virtual functions, querying the storage adapter for the boot list utilizing a VMBIOS associated with the plurality of VMs, presenting the detected boot list to a VM boot manager of the VMM, and booting each of the plurality of virtual machines utilizing each of the virtual functions, wherein each VF of the plurality of VFs is assigned to a VM of the plurality of VMs via an interconnect passthrough between the VMM and the plurality of VMs.

10 Claims, 9 Drawing Sheets

VIRTUAL FUNCTION BOOT IN MULTI-ROOT I/O VIRTUALIZATION ENVIRONMENTS TO ENABLE MULTIPLE SERVERS TO SHARE VIRTUAL FUNCTIONS OF A STORAGE ADAPTER THROUGH A MR-IOV SWITCH

RELATED APPLICATIONS

For purposes of the USPTO extra-statutory requirements, the present application constitutes a regular (non-provisional) patent application of U.S. Provisional Patent Application entitled MEGARAID-SRIOV/MRIOV, naming Parag R. Maharana as inventor, filed Oct. 26, 2010, Application Ser. No. 61/406,601.

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

TECHNICAL FIELD

The present invention generally relates to single-root and multi-root I/O virtualization in computer based systems and more particularly to virtual function boot single-root and multi-root I/O virtualization environments.

BACKGROUND

Figure 1:
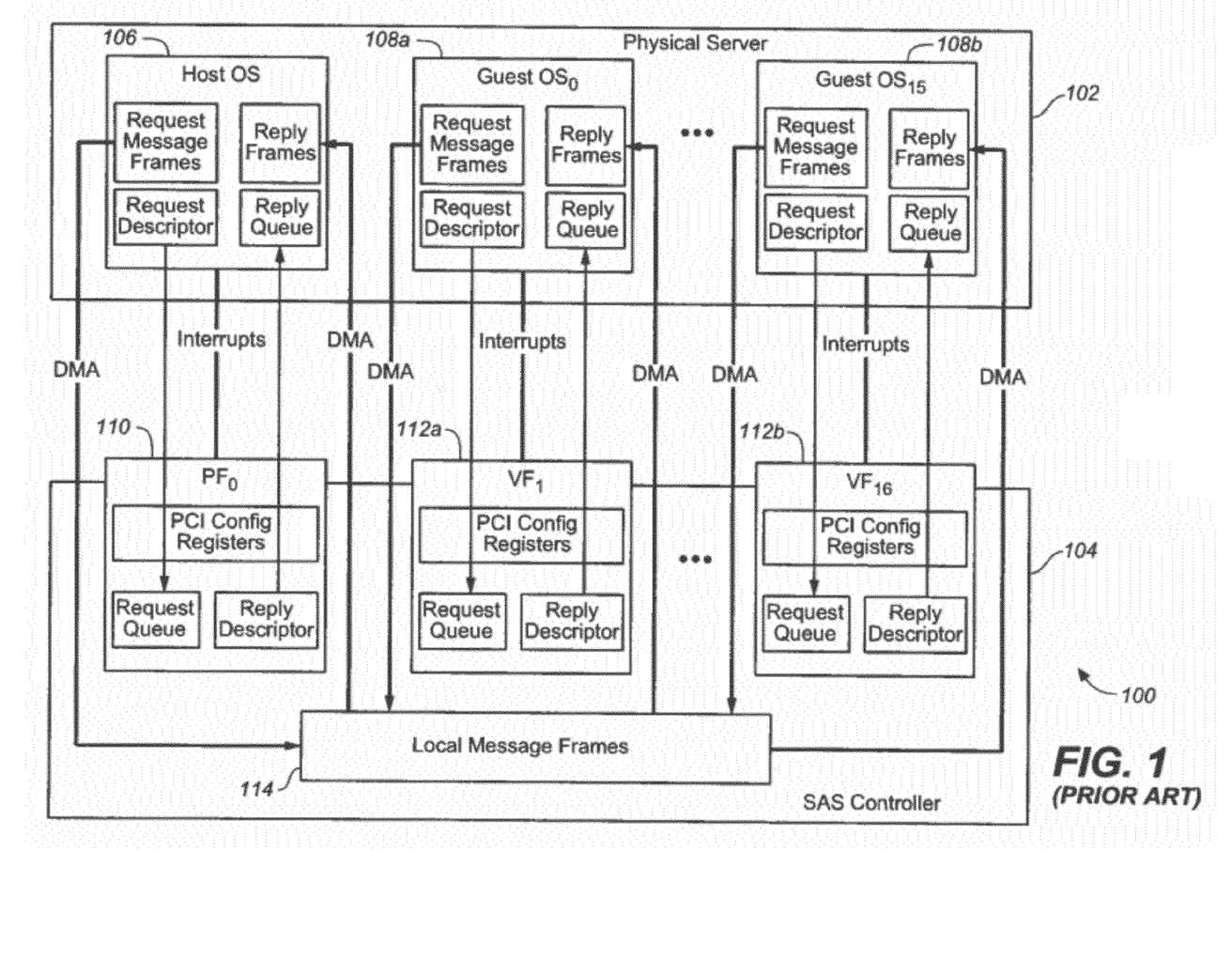
FIG. 1 illustrates a block diagram view of an SR-IOV virtualization environment.

Single-root input/output virtualization (SR-IOV) and multi-root input/output (MR-IOV) specifications allow for a single PCIe device to appear as multiple separate PCIe devices. In this sense, a physical device having SR-IOV capabilities may be configured to appear in the PCI configuration space as multiple functions. For example, SR-IOV operates by introducing the concept of physical functions (PF) and virtual functions (VFs). In a general sense, physical functions are full-featured functions associated with the PCIe device. Virtual functions, however, represent less than simple functions that lack configuration resources and only process I/O, wherein each physical function is derived from a physical function. It is further known in the art that virtual functions may be assigned to guest hosts, commonly referred to as virtual machines. FIG. 1 represents a block diagram view of an SR-IOV system 100 known in the art. The system 100 includes a physical server 102 configured to operate a host OS 106 and host Guest $OS_0$ through Guest Host $OS_{15}$, labeled as 108a and 108b respectively. The system 100 may further include a SAS controller with associated physical function $PF_0$ 110 and virtual functions $VF_1$ 112a through $VF_{16}$ 112b. The physical function, the multiple guest hosts, and the multiple virtual functions may include a variety of communication and mapping features as illustrated in FIG. 1. In a general sense, SR-IOV is the virtualization of the PCIe bus enabling single physical instances of any controller to appear as 16 to 32 virtual controllers.

SUMMARY

A method for virtual function boot in a system including a single-root I/O virtualization (SR-IOV) enabled server configured to implement a plurality of virtual machines (VMs) and a virtual machine manager (VMM) and a storage adapter including at least one physical function (PF) and configured to implement a plurality of virtual functions, wherein the SR-IOV enabled server and the physical storage adapter are communicatively couplable, is disclosed. In one aspect, a method may include, but is not limited to, upon interconnection of the storage adapter with the SR-IOV enabled server and boot of the SR-IOV enabled server and storage adapter, loading a PF driver of the PF of the storage adapter onto the SR-IOV enabled server utilizing the virtual machine manager of the SR-IOV enable server; creating a plurality of virtual functions utilizing the PF driver; detecting each of the plurality of virtual functions on an interconnection bus utilizing the VMM; maintaining a boot list associated with the plurality of virtual functions; querying the storage adapter for the boot list associated with the plurality of virtual functions utilizing a VMBIOS associated with the plurality of VMs, the VMBIOS being configured to detect the boot list associated with the plurality of virtual functions; presenting the detected boot list to a VM boot manager of the VMM utilizing the VMBIOS; and booting each of the plurality of virtual machines utilizing each of the virtual functions, wherein each VF of the plurality of VFs is assigned to a VM of the plurality of VMs via an interconnect passthrough between the VMM and the plurality of VMs, wherein each of a plurality of virtual disks (VDs) is mapped to a VF of the plurality of virtual functions utilizing the VM boot manager.

A method for virtual function boot in a system including a plurality of multi-root I/O virtualization (MR-IOV) servers, at least one MR-IOV switch, and at least one storage adapter including at least one physical function (PF) and configured to implement a plurality of virtual functions, each of the MR-IOV servers being communicatively coupled to the at least one MR-IOV switch, the at least one storage adapter being communicatively couplable to the at least one MR-IOV switch, is disclosed. In one aspect, a method may include, but is not limited to, upon interconnection of the at least one storage adapter with the at least one MR-IOV switch, loading a physical function (PF) driver of the at least one storage adapter onto the MR-IOV switch; creating a plurality of virtual functions (VFs) utilizing the PF driver on MR-IOV switch; assigning each of the VFs to an MR-IOV server of the plurality of MR-IOV servers; identifying each of the plurality of VFs as a virtual storage adapter by the plurality of MR-IOV servers, wherein each MR-IOV server identifies a VF as a virtual storage adapter; loading a UEFI driver onto each of the VFs; obtaining a boot list associated with the plurality of virtual functions from firmware of the at least one storage adapter utilizing the UEFI driver loaded on each of the VFs, wherein the boot list is configured to associate each virtual function with a corresponding boot disk; and booting a plurality of boot disks utilizing each of the VFs assigned to each of the MR-IOV servers utilizing the obtained boot list.

A system for virtual function boot in a SR-IOV environment is disclosed. In one aspect, a system may include, but is not limited to, a single-root I/O virtualization (SR-IOV) server configured to implement a plurality of virtual machines (VMs) and a virtual machine manager (VMM); and a storage adapter including at least one physical function (PF), storage adapter configured to implement a plurality of virtual functions, the storage adapter being communicatively couplable to the SR-IOV enabled server via a PCIe slot of the SR-IOV enabled server, wherein, upon interconnection of the storage adapter with the SR-IOV enabled server, the storage adapter and the SR-IOV enabled server are configured to: load a PF driver of the PF of the storage adapter onto the SR-IOV enabled server utilizing the virtual machine manager of the SR-IOV enable server; create a plurality of virtual functions utilizing the PF driver; detect each of the plurality of virtual functions on an interconnection bus utilizing the VMM; maintain a boot list associated with the plurality of virtual functions; query the storage adapter for the boot list associated with the plurality of virtual functions utilizing a VMBIOS associated with the plurality of VMs, the VMBIOS being configured to detect the boot list associated with the plurality of virtual functions; present the detected boot list to a VM boot manager of the VMM utilizing the VMBIOS; and boot each of the plurality of virtual machines utilizing each of the virtual functions, wherein each VF of the plurality of VFs is assigned to a VM of the plurality of VMs via an interconnect passthrough between the VMM and the plurality of VMs, wherein each of a plurality of virtual disks (VDs) is mapped to a VF of the plurality of virtual functions utilizing the VM boot manager.

A system for virtual function boot in a MR-IOV environment is disclosed. In one aspect, a system may include, but is not limited to, at least one MR-IOV switch; a plurality of multi-root I/O virtualization (MR-IOV) servers, each of the plurality of MR-IOV servers being communicatively coupled to the MR-IOV switch via a PCIe link; and at least one storage adapter including at least one physical function (PF), the at least one storage adapter configured to implement a plurality of virtual functions, the at least one storage adapter being communicatively couplable to the at least one MR-IOV switch via a PCIe slot of the MR-IOV switch, wherein, upon interconnection of the at least one storage adapter with the at least one MR-IOV switch, the at least one storage adapter, the MR-IOV switch, and the plurality of MR-IOV servers are configured to: load a physical function (PF) driver of the at least one storage adapter onto the MR-IOV switch; create plurality of virtual functions (VFs) utilizing the PF driver on MR-IOV switch; assign each of the VFs to an MR-IOV server of the plurality of MR-IOV servers; identify each of the plurality of VFs as a virtual storage adapter by the plurality of MR-IOV servers, wherein each MR-IOV server identifies a VF as a virtual storage adapter; load a UEFI driver onto each of the VFs; obtain a boot list associated with the plurality of virtual functions from firmware of the at least one storage adapter utilizing the UEFI driver loaded on each of the VFs, wherein the boot list is configured to associate each virtual function with a corresponding boot disk; and boot a plurality of boot disks utilizing each of the VFs assigned to each of the MR-IOV servers utilizing the obtained boot list.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIG. 1 through 8, systems and methods for physical storage adapter virtual function booting in single-root and multi-root I/O virtualization environments is described in accordance with the present disclosure.

Figure 2A:
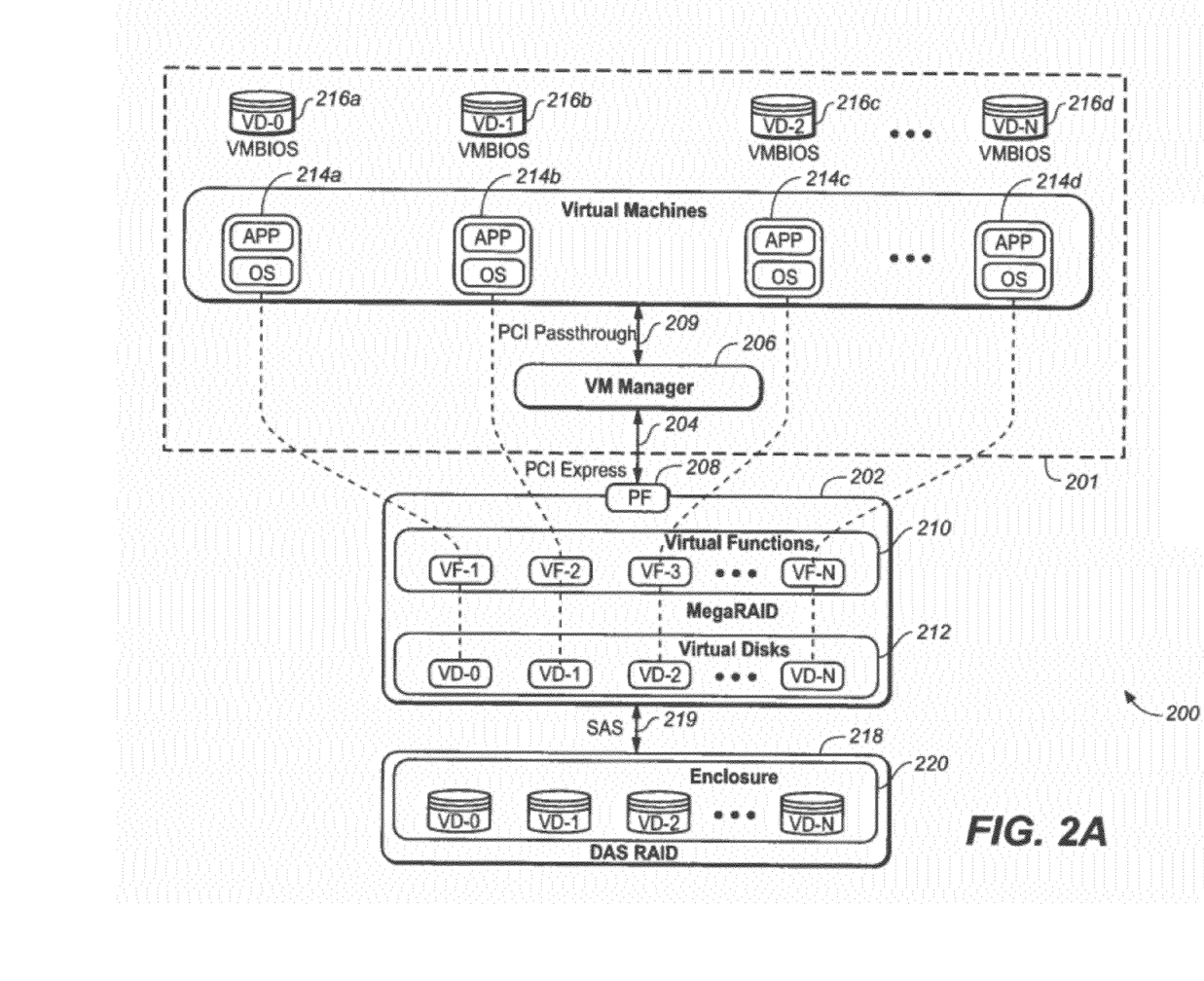
FIG. 2A illustrates a block diagram view of a system suitable for virtual function boot in a single-root I/O virtualization (SR-IOV) environment, in accordance with one embodiment of the present invention.

FIG. 2A illustrates a block diagram view of a system 200 suitable for virtual function boot in a single-root I/O virtualization (SR-IOV) environment, in accordance with one embodiment of the present invention. The system may include an SR-IOV enabled server 201 and a storage adapter 202 (e.g., MegaRAID controller). The present disclosure will focus on an implementation of a MegaRAID controller 202. Those skilled in the art, however, should recognize that the concepts described in the present disclosure may be extended to include storage adapters other than MegaRAID controllers. As such, the description of MegaRAID controller 202 should not be interpreted as a limitation but rather merely as an illustration.

The SR-IOV enabled server 201 of the present invention may include any server known in the art capable of implementing SR-IOV. For instance, the SR-IOV enabled server 201 may include a VT-D enabled Intel® server. For example, the SR-IOV enabled server 201 may include, but is not limited to, an Intel® Xenon® 5500 or 5600 server. Those skilled in the art should recognize that the SR-IOV enabled server 201 is not limited to Intel or Xenon® based server technology, but, rather, the above description should be interpreted merely as an illustration.

In one aspect, the SR-IOV enabled server 201 and the MegaRAID card 202 are communicatively couplable via an interconnection bus. For example, the interconnection bus may include a PCI Express (PCIe) interconnection bus 204 (e.g., PCI Express 2.0). In this manner, a user may insert/connect the MegaRAID card 202 in the PCIe server slot (not shown) of the SR-IOV enabled server 201, thereby establishing a communication link between the server 201 and physical function 208 of the MegaRAID card 202.

In one aspect, the SR-IOV enabled server 201 may be configured to host multiple virtual machines (VMs). For example, the SR-IOV enabled server 201 may host a first VM 214a, a second VM 214b, a third VM, and up to and including an Nth VM 214d. Further, the server 201 may be configured to host a virtual machine manager (VMM) 206. For example, the server 201 may host a hypervisor (e.g., Xen or KVM) configured to manage the VMs 214a-214d. Throughout the present invention the terms "hypervisor" and "virtual machine manager (VMM)" will be used interchangeably. Those skilled in the art should recognize that a VMM and a hypervisor are generally known in the art to be equivalent. In a general sense, those skilled in the art should recognize that a hypervisor is software installed on a server utilized to run guest operating systems (i.e., virtual machines) on the given server. In this manner, a hypervisor may be installed on the SR-IOV enabled server 201 in order to manage the VMs 214a-214d, wherein virtual functions of the system 200 are assigned and operated by the VMs 214a-214d, as will be discussed in greater detail further herein.

In another aspect, the MegaRAID controller 202 includes a physical function (PF) 208. The PF 208 may be configured to implement a plurality of virtual functions (VFs) on the MegaRAID controller 202. For example, virtual functions VF-1, VF-2, VF-3, and up to and including VF-N may be implemented on MegaRAID controller 202.

Figure 2B:
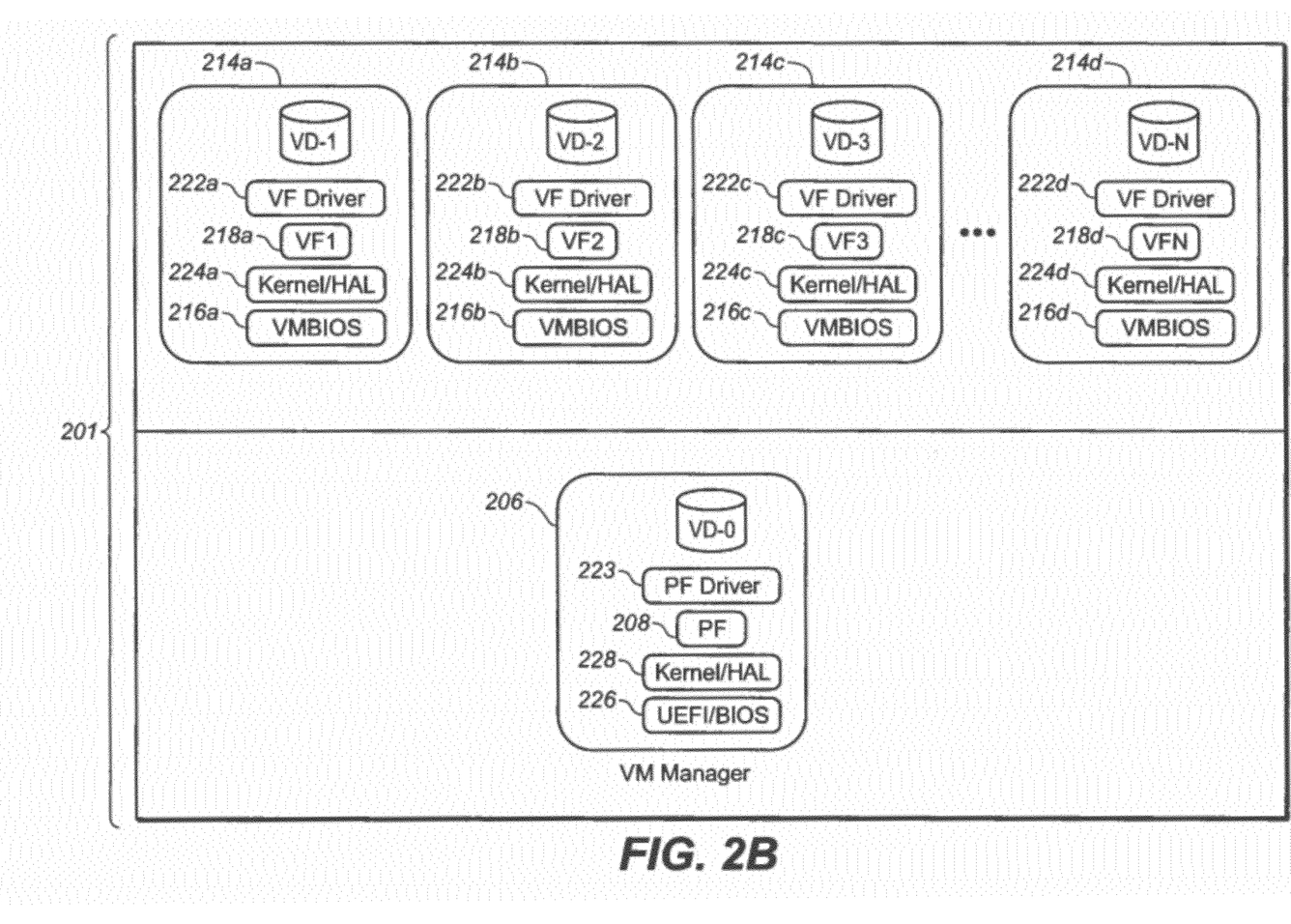
FIG. 2B illustrates a block diagram view of the kernel view of a system suitable for virtual function boot in a single-root I/O virtualization (SR-IOV) environment, in accordance with one embodiment of the present invention.

FIG. 2B represents a block view diagram illustrating the kernel space view of the SR-IOV enabled server 201 following interconnection of the MegaRAID card 202 and the server 201 via the PCIe interconnect 204. As shown in FIG. 2B, the VM Manager 206 includes a virtual disk VD-0, a PF driver 223 loaded from the MegaRAID controller 202, a kernel 228, and system BIOS and/or UEFI 226. Each of the virtual machines includes a virtual disk, a virtual function driver, a virtual function, a kernel, and a VMBIOS. For example, virtual machine 214a includes virtual disk VD-1, VF driver 222a, virtual function VF1 218a, kernel 224a, and VMBIOS 216a.

Upon interconnection of the MegaRAID card 201 with the SR-IOV enabled server 201 via the PCIe slot of the server 201, the system 200 may boot firmware of the SR-IOV enabled server 201. For example, the system 200 may boot the BIOS or UEFI 226 of the SR-IOV server 201. Likewise, the system 200 may boot firmware of the MegaRAID controller 202. During the boot process of the SR-IOV enabled server 201 and the storage adapter 202 firmware 226, the VM manager 206 (e.g., hypervisor) may identify the physical function (PF) of the storage adapter 202 as the controller of the SR-IOV enabled server 201.

Following the firmware boot sequence, the VM Manager 206 may load a PF driver 208 onto the SR-IOV enabled server 201. Applicant notes that FIG. 2B illustrates the kernel level view of the SR-IOV enabled server 201 following this PF driver 208 loading process. Further, the system 200 may create a set of virtual functions 210 using the PF driver 208. In this sense, the PF driver 223 may enumerate the virtual functions of the storage adapter 202 for use by the VM manager 206. As shown in FIG. 2A, the MegaRAID card 202 may host a first virtual function VF-1, a second virtual function VF-2, a third virtual function VF-3, and up to and including an Nth virtual function VF-N. It is contemplated herein that the creation and enumeration of the virtual functions 210 may depend on a variety of factors. These factors may include, but are not limited to, operational configuration of the VM manager 206 (i.e., the hypervisor) or hardware capabilities (e.g., SR-IOV enabled server capabilities) of the system 200.

In a further aspect, each of a set of virtual disks (VDs) 212 may be assigned to a virtual function of the storage adapter 202. For example, VD-0 may be assigned to VF-0, VD-1 may be assigned to VF-1, VD-2 may be assigned to VF-2, VD-3 may be assigned to VF-3, and VD-N may be assigned to VF-N, as shown in the logical view of storage adapter 202 of FIG. 2A. Further, the set of virtual disks 212 may create a RAID volume 218 (e.g., DAS RAID). In this sense, an enclosure 220 of the system 200 may host one or more physical disks (e.g., HDDs or SSDs), as illustrated in FIG. 2A. Applicant notes that the physical disks of the enclosure 218 are not necessarily the same in number as the number of VDs of the RAID volume. Those skilled in the art should recognize that multiple RAID volumes may be formed from a single disk. In a general sense, any number of VDs may be created from any number of physical disks. As the focus of the present invention is on the VDs of the system 200, VD-0 . . . VD-N are illustrated within the enclosure 118 in order to illustrate that the VDs of the RAID volume 118 are hosted on the physical disks of the enclosure 220. It should further be recognized that the DAS RAID 218 and the storage adapter 202 may be communicatively coupled via a serial-attached-SCSI (SAS) interconnection bus 219.

Next, the VM manager 206 of the SR-IOV enabled server 201 may detect each of the set of virtual functions on the PCIe bus 204. In this regard, the VM manager 206 detects a given VF (e.g., VF-0 . . . VF-N) as a PCIe device. The storage adapter 202 may maintain and track boot data for each of the virtual functions utilizing firmware running on the storage adapter 202. In this regard, the storage adapter 202 may maintain and track each virtual function boot data separately. As such, the storage adapter 202 may maintain a boot list associated with the set of virtual function 210.

It is noted herein that the virtual machines (i.e., guest domains) of the present invention (and in a general sense) do not include system BIOS or UEFI to detect the boot drive. As such, the system 200 may be configured to automatically load and execute expansion VMBIOS whenever a user creates a new virtual machine. In this setting, when the boot disk is exposed then a BIOS emulation module of the VM manager 206 may execute the boot sequence. First, the BIOS emulation module may load the bootstrap from the boot disk via the BIOS. Once the OS loader is loaded then a user may add a VF driver into OS. As such, the VF driver will have full access to the associate disk.

In one aspect, the VMBIOS may query the storage adapter 202 for the boot list associated with the set of virtual functions 210. For example, the VMBIOS (e.g., 216a . . . 216d) may query the firmware of storage adapter 202 for the boot list associated with the set of virtual functions. For example, in the case where first virtual function VF-1 218a queries the storage adapter firmware, the firmware may be configured to return boot data for VF-1 of 210. By way of another example, in the case where the Nth virtual function VF-N 218d queries the storage adapter firmware, the firmware may be configured to return boot data for VF-N of 210.

In another aspect, the storage adapter 202 may be configured to maintain boot data in a manner to correlate a first virtual function VF-1 to VD-1, a second virtual function VF-2 to VD-2, and up to an Nth virtual function VF-N to VD-N. Applicant notes that the numbering scheme disclosed above is merely implemented for illustrative purposes and should not be interpreted as a limitation on the present invention.

Further, the VMBIOS may be utilized to present the detected boot list to a VM boot manager of the VM manager 206. In turn, each of the set of virtual disks (e.g., VD-0 . . .

VD-N) may be mapped to a specific virtual function of the set of virtual functions utilizing the VM boot manager of the VM manager 206.

In another aspect, the virtual functions may be utilized to boot each of the set of virtual machines 214a . . . 214d. For example, in terms of the kernel view of FIG. 2B, the virtual functions 218a . . . 218d may be utilized to boot each of the set of virtual machines 214a . . . 214d respectively. In this regard, each of the virtual functions 214 . . . 214d is assigned to a single virtual machine of the group 214a . . . 214d via the PCIe passthrough 209. In this regard, when a user creates a given virtual machine and assigns a given virtual function as a PCIe resource to the given virtual machine the VM manager 206 may designate the given virtual function for PCIe passthrough. It should be recognized by those skilled in the art that PCIe passthrough may be managed utilizing the VM manager 206 (e.g., hypervisor).

Figure 3:
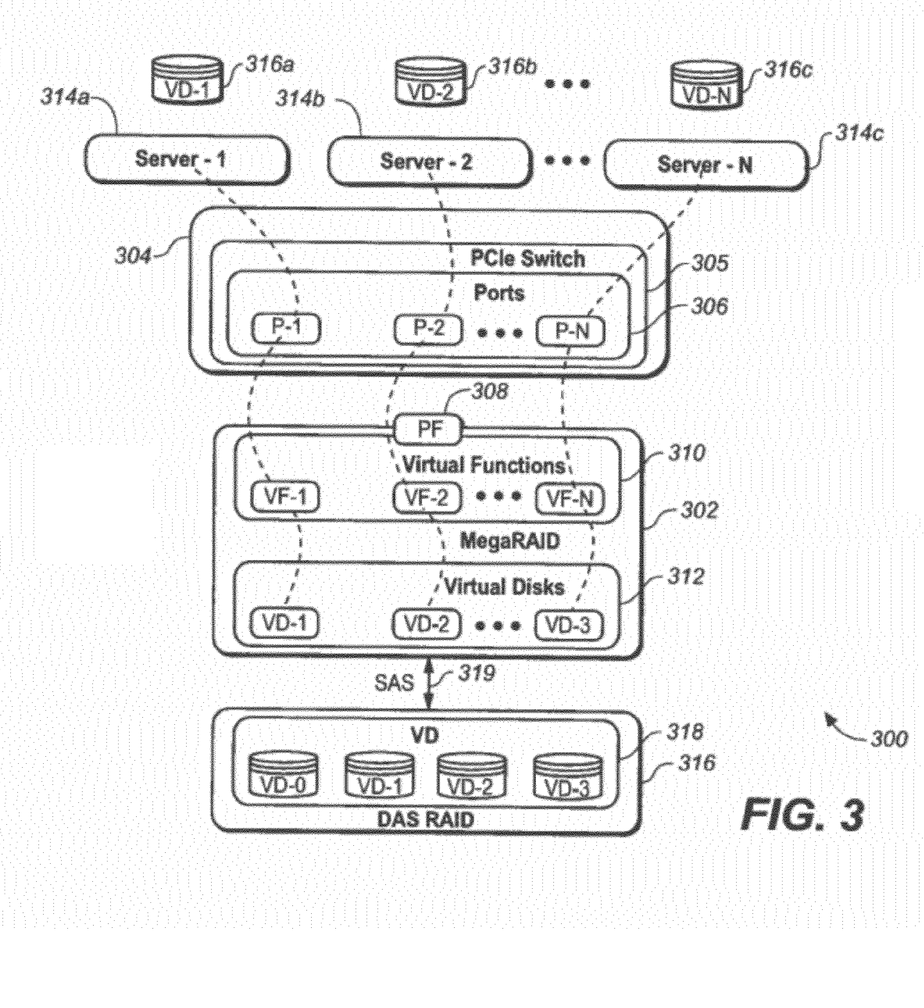
FIG. 3 illustrates a block diagram view of a system suitable for virtual function boot in a multi-root I/O virtualization (MR-IOV) environment, in accordance with one embodiment of the present invention.

FIG. 3 illustrates a block diagram view of a system 300 suitable for virtual function boot in a MR-IOV environment, in accordance with a further embodiment of the present invention. Applicant notes that unless otherwise noted the features and components as described previously herein with respect to system 200 should be interpreted to extend through the remainder of the disclosure.

The system 300 may include a plurality of servers including a first server 314a, a second server 314b, and an up to an including an Nth server 314c. It should be recognized that standard server technology is suitable for implementation in the context of the MR-IOV environment of the present invention. In this sense, any suitable server technology known in the art may be implemented as one of the plurality of servers of the present invention.

In another aspect, the system 300 may include a storage adapter 302. As in system 200, the storage adapter 302 may include a MegaRAID controller 302. The adapter 302 may include a physical function 308, a plurality of virtual functions 310 (e.g., VF-1 . . . VF-N) and a corresponding plurality of virtual disks 312 (e.g., VD-1 . . . VD-N). In addition, the storage adapter 302 may be coupled to a RAID volume 216 formed from a multiple physical disks (e.g., HDDs) of enclosure 318 via a SAS connection 319.

In another aspect, the system 300 may include a MR-IOV switch 304. The MR-IOV switch 304 may include, but is not limited to, a PCIe switch 305. The PCIe switch 305 may include a plurality of ports P-1, P-2 and up to and including P-N.

In a further aspect, MegaRAID card 302 and the MR-IOV switch 304 are communicatively couplable via a interconnection bus. For example, the interconnection bus may include a PCI Express (PCIe) interconnection bus (not shown) (e.g., PCI Express 2.0). In this manner, a user may insert/connect the MegaRAID card 302 in the PCIe server slot (not shown) of the MR-IOV switch 304, thereby establishing a communication link between the MR-IOV switch 304 and physical function 308 of the MegaRAID card 302.

Further, each of the MR-IOV servers 314a . . . 314c and the MegaRAID card 302 are communicatively couplable via an interconnection link. For example, each server 314a . . . 314c may individually be coupled to the MR-IOV switch 304 via an interconnection link (e.g., interconnection cables). For example, the interconnection link may include a PCI Express cable. In this regard, the MR-IOV switch 302 is configured to assign each virtual function of the system 300 to a server (e.g., 314a . . . 314c) through PCIe communication.

Upon interconnection of the storage adapter 302 with the MR-IOV switch 304, a physical function driver of the storage adapter 302 may be loaded on the MR-IOV switch 304. Then, the PF driver loaded on the MR-IOV switch may be utilized to create a plurality of virtual functions VF-1 through VF-N. The MR-IOV switch 304 may then assign each of the virtual functions VF-1 . . . VF-N to an individual MR-IOV server 314a . . . 314c.

It is noted herein that each of the MR-IOV servers 314a . . . 314c is capable of booting with standard system BIOS/UEFI. The UEFI/BIOS of the MR-IOV servers 314a . . . 314c may identify each of the virtual functions VF-1 . . . VF-N as virtual adapters. In this manner, each MR-IOV server identifies a single virtual function as a virtual storage adapter. Then, system UEFI/BIOS loads UEFI drivers (or Adapters option ROM) for the storage adapter 302.

Next, the UEFI driver (or Option ROM) may obtain a boot list associated with the plurality of virtual functions from firmware of the storage adapter 302. For example, the UEFI driver loaded on each of the virtual functions may be utilized to obtain a boot list from the firmware of the storage adapter 302. The boot list is configured to associate each virtual function VF-1 . . . VF-N with a corresponding boot disk VD-1 . . . VD-N. In this manner, once a UEFI driver or Option ROM has been loaded on a virtual function, the virtual function may issue a command to the storage adapter 302. Upon receiving the command, the storage adapter 302 (via firmware) may determine the requesting virtual function and provide that virtual function with the associated boot disk information. Further, once a given disk is identified as a boot disk for a given server this disk is mark as the dedicated boot disk for this server. This information may be utilized in future queries.

In a further aspect, the boot manager of each of the MR-IOV servers 314a . . . 314c may utilize the boot list to boot the plurality of boot disks. In this manner, the boot manager may utilize the boot list and the virtual functions VF-1 . . . VF-N assigned to each MR-IOV server 314a . . . 314c to boot each of the plurality of disks VD-1 . . . VD-N.

It is recognized herein that once the kernel is loaded it may prompt for a kernel driver for a given virtual function. Once the OS loaded, the OS will provide direct access to the boot disk information.

Figure 4:
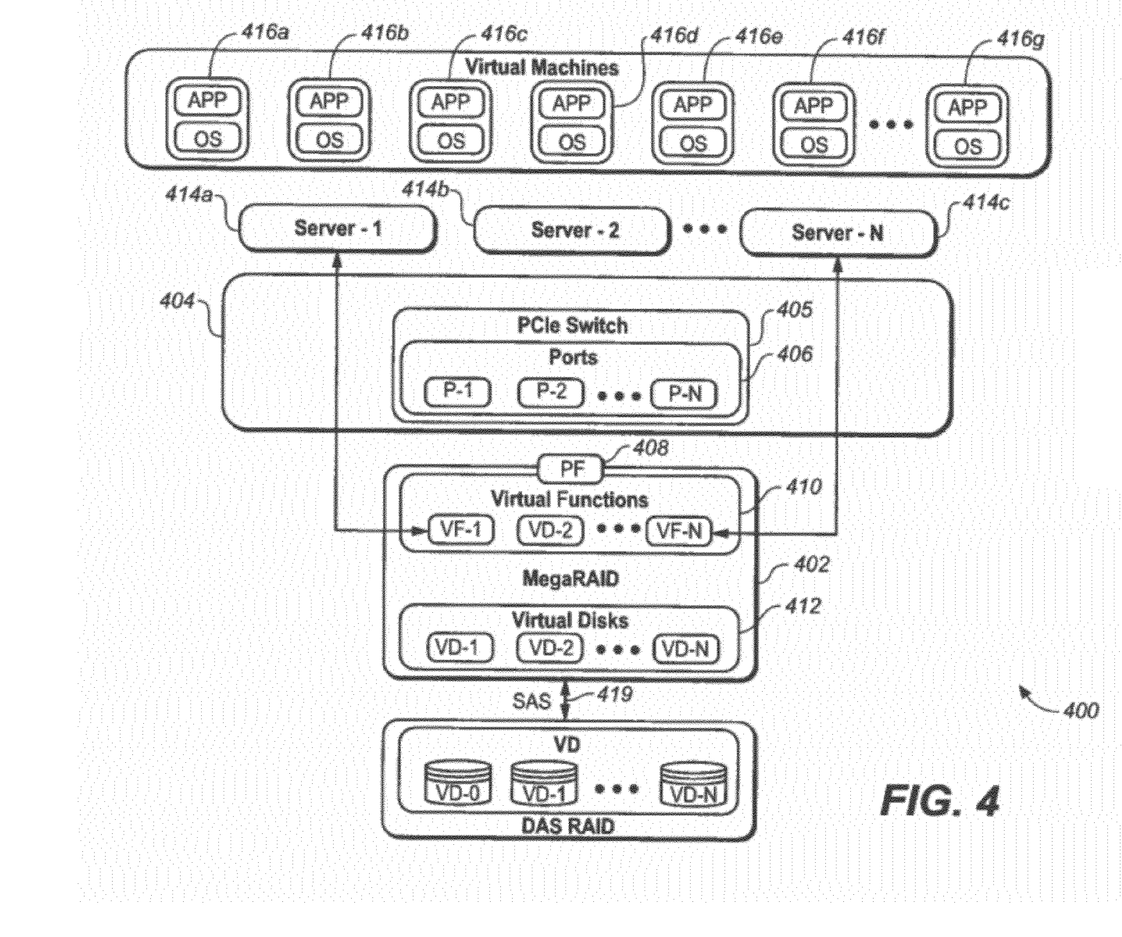
FIG. 4 illustrates a block diagram view of a system suitable for virtual function boot in a MR-IOV environment equipped with multi-node clustering capabilities, in accordance with one embodiment of the present invention.

FIG. 4 illustrates a system 400 suitable for virtual function boot in a MR-IOV environment equipped with multi-node clustering capabilities, in accordance with one embodiment of the present invention. The system 400 is built on an architecture similar to that described with respect to system 200. As such, the components and features of system 200 should be interpreted to extend to system 400. The system 400 includes a plurality of servers 414a . . . 414c hosting a plurality of virtual machines 416a . . . 416g, a MR-IOV switch 404 including a PCIe switch 405 with multiple ports 406, a storage adapter (e.g., MegaRAID card 402) having a plurality of virtual functions 410 associated with a plurality of virtual disks 412.

In a further embodiment, the MR-IOV switch is configured to perform multi-node clustering using the single storage adapter 402. In this regard, a first virtual function (e.g., VF-1) is assigned to a first MR-IOV server (e.g., 414a) and a second virtual function (e.g., VF-2) is assigned to a first MR-IOV server (e.g., 414c) utilizing the MR-IOV switch 404. It should be noted that the degree of clustering implemented by system 400 is not limited to two. Rather, it is only limited by the number of available virtual functions VF-1 . . . VF-N. As such, in a general sense, the system 400 may implement N-node clustering.

In this embodiment, all cluster volumes may represent shared volumes. In this regard, the volumes are only visible to predefined nodes. When a given cluster is enabled all of the disks (e.g., LUN) are visible to all nodes of the cluster. For example, VD-1 may be visible to server-1 414*a* and server-N 414*c*, as shown in FIG. 4. Further, a virtual machine (VM) 416*a* may be created and assigned to VD-1 for storage in server-1 414*a*. Prior to creation of VM 416*a*, server-1 414*a* may issue PERSISTENT RESERVE via the storage adapter 402 firmware and takes ownership of this volume. All of the operating system and associated data are then stored in VD-1 from VM 416*a*. At the same time, VD-1 is also available to server-N 414*c*, however it does not have the ability to modify the arrangement as VD-1 has ownership of the volume. In the event a user is required to move VM 416*a* from Server-1 to Server-N then a process performed by Live Migration (Hyper-V) or vMotion (VMware) software may carry out the transfer. Since the VD-1 contains the pertinent information, Live Migration or vMotion need only transfer ownership from Server-1 to Server-N by issuing a RELEASE from Server-1 and RESERVE from Server-N. It is noted herein that the process only transfers control from server-1 to server-N. Migration of actual data from server-1 to server-3 is not required.

Figure 5:
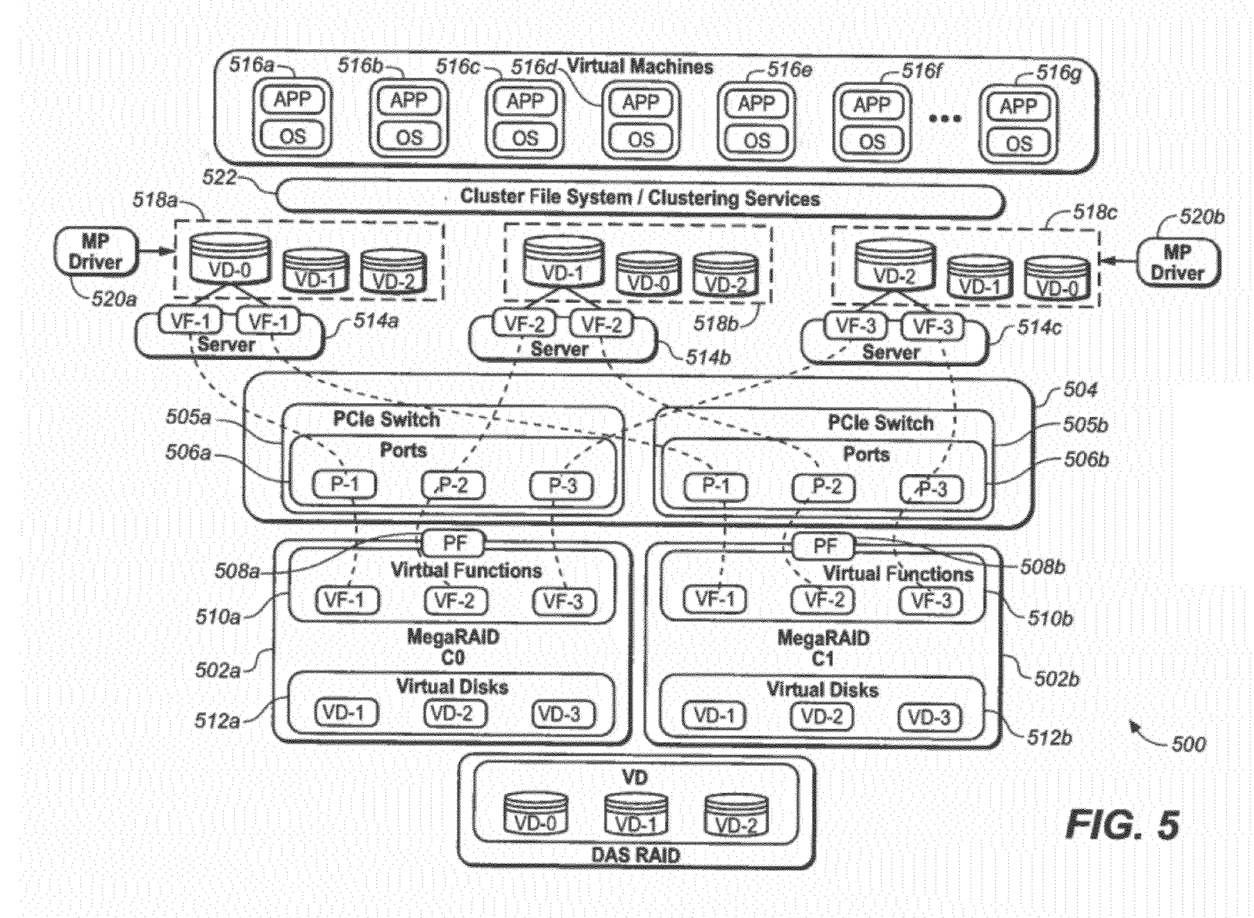
FIG. 5 illustrates a block diagram view of a system suitable for virtual function boot in a MR-IOV environment equipped with multi-level HA capabilities, in accordance with one embodiment of the present invention.

FIG. 5 illustrates a system 500 suitable for virtual function boot in a MR-IOV environment equipped with multi-level HA capabilities, in accordance with one embodiment of the present invention. The system 500 includes a plurality of servers 514*a* ... 514*c* hosting a plurality of virtual machines 516*a* ... 516*g*. The system 500 further includes two or more MR-IOV switches. For example, the system 500 may include MR-IOV switch include a first PCIe switch 505*a* with multiple ports 506*a* and a second PCIe switch 505*b* with multiple ports 506*b*. Further, the system 500 may include multiple storage adapters. For example, the system 500 may include a first storage adapter (e.g., MegaRAID card 502*a*) having a plurality of virtual functions 510*a* and a plurality of virtual disks 512*a* and a second storage adapter (e.g., MegaRAID card 502*b*) having a plurality of virtual functions 510*b* and a plurality of virtual disks 512*b*. Each adapter 502*a* and 502*b* may also include a physical function (PF) 508*a* and 508*b* respectively. Applicant notes that the present embodiment is not limited to two storage adapters or two PCIe switches. In a general sense, the system 500 may be extended to N nodes and the illustration of two adapters operating in conjunction with two PCIe switches has been utilized for purposes of simplicity.

In a further embodiment, the multiple PCIe switches (e.g., 505*a* and 505*b*) are configured to perform N-node utilizing multiple storage adapters (e.g., 502*a* and 502*b*). In this manner, a first virtual function (e.g., VF-1 of 510*a*) may be assigned to a first MR-IOV server 514*a* utilizing the first PCIe switch 505*a*. Further, a second virtual function (e.g., VF-1 of 510*b*) may be assigned to the first MR-IOV server 514*a* utilizing the second PCIe switch 505*b*. This concept may be extended to all servers 514*a* ... 514*c* with all virtual functions of all of the storage adapters 502*a* and 502*b* of the system 500, as illustrated by the dotted lines in FIG. 5.

This configuration allows the same RAID volume to appear twice in each node via the two assigned virtual functions. In turn, this allows for multi-path solution for multi-path redundancy. In this embodiment, the storage adapters 502*a*-502*b* firmware may be configured to provide TPGS/ALUA (SCSI3) support. Further, one of the two volumes available to all servers is Active path, where as the second of the two volumes is passive path. In this sense, it should be straightforward for the multi-path solution to identify which adapter is Active optimized and which adapter is Non-active optimized.

When a given RAID volume is "owned" by a given storage adapter (e.g., 502*a* or 502*b*), all of the associated virtual functions belonging to the same controller will have an Active path. In a general sense, when a path is labeled as Active, I/O through that path will be optimized and may deliver faster speeds than the non-active path.

Figure 6:
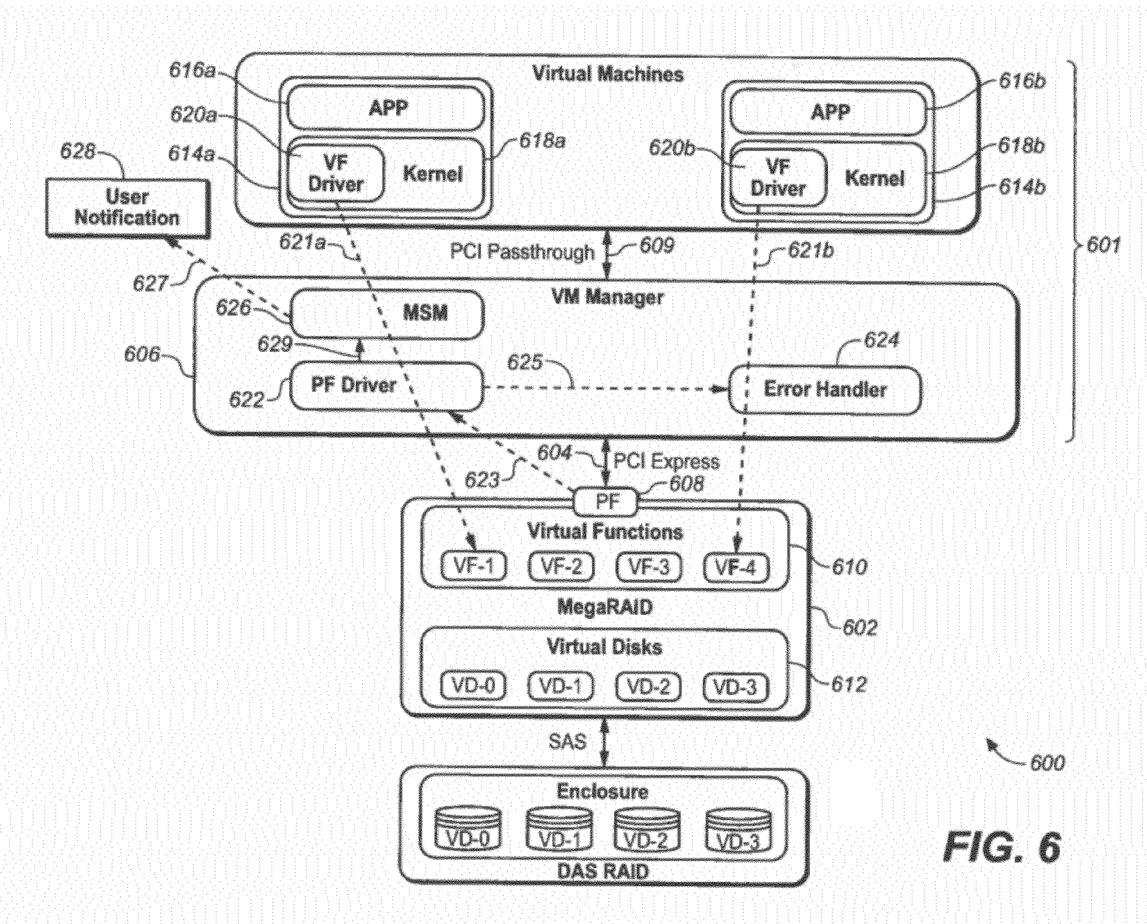
FIG. 6 illustrates a block diagram view of a system suitable for virtual function boot in a SR-IOV environment equipped with diagnostic messaging capabilities, in accordance with a further embodiment of the present invention.

FIG. 6 illustrates a block diagram view of a system 600 suitable for virtual function boot in a SR-IOV environment equipped with diagnostic messaging capabilities, in accordance with a further embodiment of the present invention. The system 600 includes, but is not limited to, an SR-IOV enabled server 601 configured to host multiple virtual machines 614*a*-614*b* and a storage adapter 602 (e.g., MegaRAID controller) communicatively couplable to the server 601 via a PCIe interconnect 604. Similarly to system 200 of FIG. 2A, system 600 also includes a set of virtual functions 610 and virtual disks 612 of the storage adapter (e.g., MegaRAID card 602). In addition, the system 600 includes a set of virtual machines 614*a*-614*b* hosted on the SR-IOV enabled server 601. Each virtual machine may include an application set (e.g., 616*a* or 616*b*) and a kernel (e.g., 618*a* or 618*b*). Each kernel may include a virtual function driver (e.g., 620*a* or 620*b*).

It is recognized herein that a virtual function (VF) driver (e.g., 620*a* or 620*b*) may be configured to issue a status of the VF driver to an interface the storage adapter 202. In turn, this issuance may allow the storage adapter firmware to acknowledge the received status and forward the status to a PF driver 622 in the associated VM manager 606 (coupled to the adapter 602 via PCIe). In addition, it is further contemplated herein that the storage adapter 602 may take action based on status received from the VF driver 614*a*-614*b*. The PF driver 622 may further forward the status to a user interface suitable for user notification 628. Alternatively, the PF driver 622 may forward the status to an error handler of the 624 of the VM manager 606.

In one embodiment, after detecting an event (or lack of an event), a VF driver 614*a* or 614*b* may transmit a status signal 621*a* or 621*b* from the VF driver 614*a* or 614*b* to the storage adapter 602. For example, the status signal 621*a* or 621*b* may be indicative of a status of the VF driver 614*a* or 614*b*. Further, the status signal 621*a* or 621*b* may be received from a VF driver by a corresponding VF function. For instance a signal 621*a* transmitted by a first VF driver 614*a* (representing the VF driver of the VM associated with VF-1) may be received by VF-1 of the storage adapter 602. Similarly, a signal 621*b* transmitted by a fourth VF driver 614*b* may be received by VF-4 of the storage adapter 202. Then, the storage adapter 202 may store information indicative of the status transmitted by the status signal 621*a* or 621*b* utilizing the storage adapter firmware and a memory of the adapter 202.

Next, the storage adapter 202 may relay the original status by transmitting a signal 623 indicative of the status to the PF driver 622 in the VM manager 606.

Then, the PF driver 622 may relay the status by transmitting a signal 625 to an error handler 624 of the VM manager 624. In this manner, the error handler 624 may be pre-programmed by a user to implement a particular course of action based on the information content of the signal 625 received by the error handler 624. Alternatively, the PF driver 22 may relay the status to a management tool 626 of the VM manager 602 via signal 629. In turn, the management tool 626 may transmit a user signal 627 to a user interface (not shown), wherein the user signal is configured to trigger a pre-determined message (e.g., textual message, audio message, video message) selected based on one or more characteristics (e.g., information content related to status of VF driver 614*a* or 614*b*) of the status signal 629 received by the management tool 626.

It is further contemplated herein that the above described diagnostic messaging process may be extended to an MR-IOV environment. In this regard, the storing of status information, error handling, a transmission of signals to a user interface may be handled by a MR-IOV switch rather than a VM manager.

Figure 7:
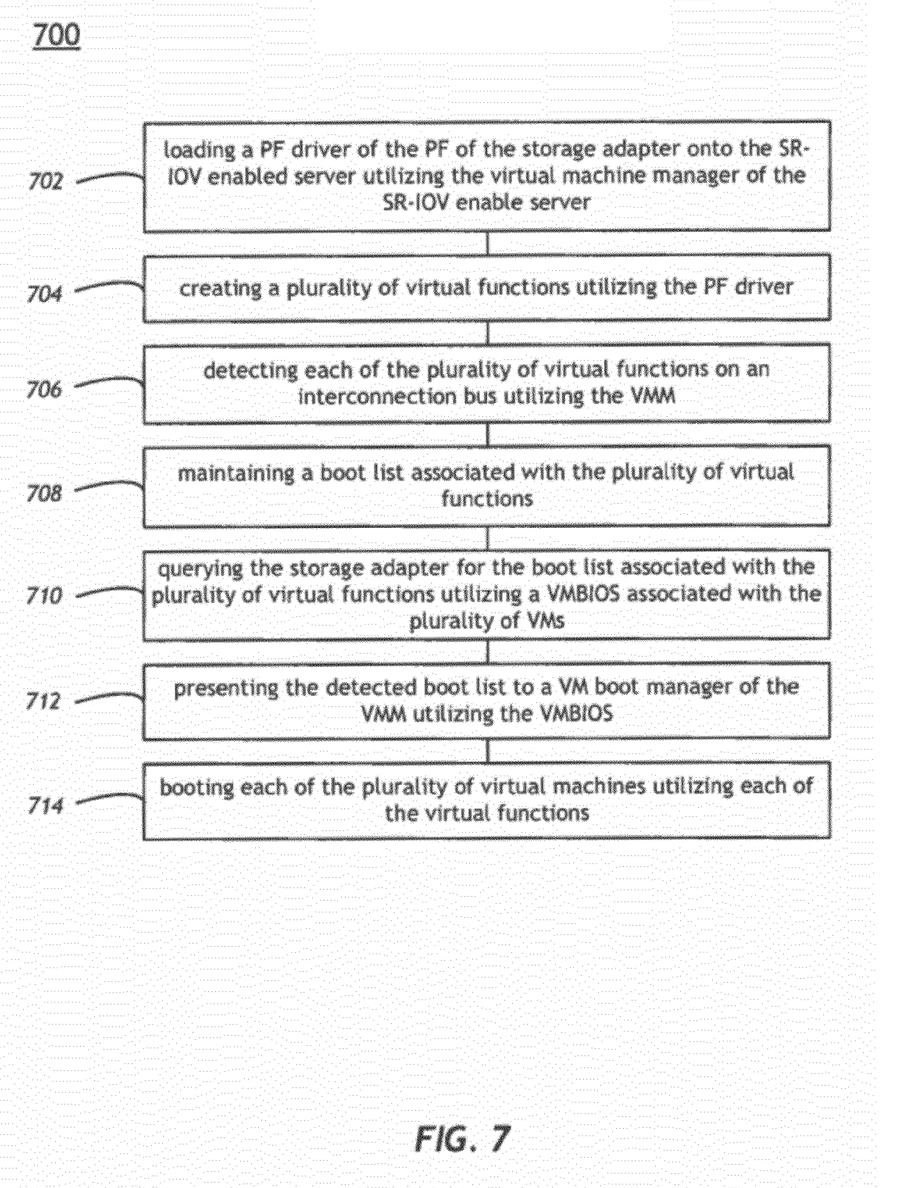
FIG. 7 illustrates a flow diagram depicting a process for VF function boot in a SR-IOV environment, in accordance with one embodiment of the present invention.

FIG. 7 illustrates a flow diagram depicting a process for VF function boot in a SR-IOV environment, in accordance with one embodiment of the present invention. Step 702 may load a PF driver of the PF of the storage adapter onto the SR-IOV enabled server utilizing the virtual machine manager of the SR-IOV enable server. Step 704 may create a plurality of virtual functions utilizing the PF driver. Step 706 may maintain a boot list associated with the plurality of virtual functions. Step 708 may detect each of the plurality of virtual functions on an interconnection bus utilizing the VMM. Step 710 may query the storage adapter for the boot list associated with the plurality of virtual functions utilizing a VMBIOS associated with the plurality of VMs, the VMBIOS being configured to detect the boot list associated with the plurality of virtual functions. Step 712 may present the detected boot list to a VM boot manager of the VMM utilizing the VMBIOS. Step 714 may booting each of the plurality of virtual machines utilizing each of the virtual functions, wherein each VF of the plurality of VFs is assigned to a VM of the plurality of VMs via an interconnect passthrough between the VMM and the plurality of VMs, wherein each of a plurality of virtual disks (VDs) is mapped to a VF of the plurality of virtual functions utilizing the VM boot manager.

Figure 8:
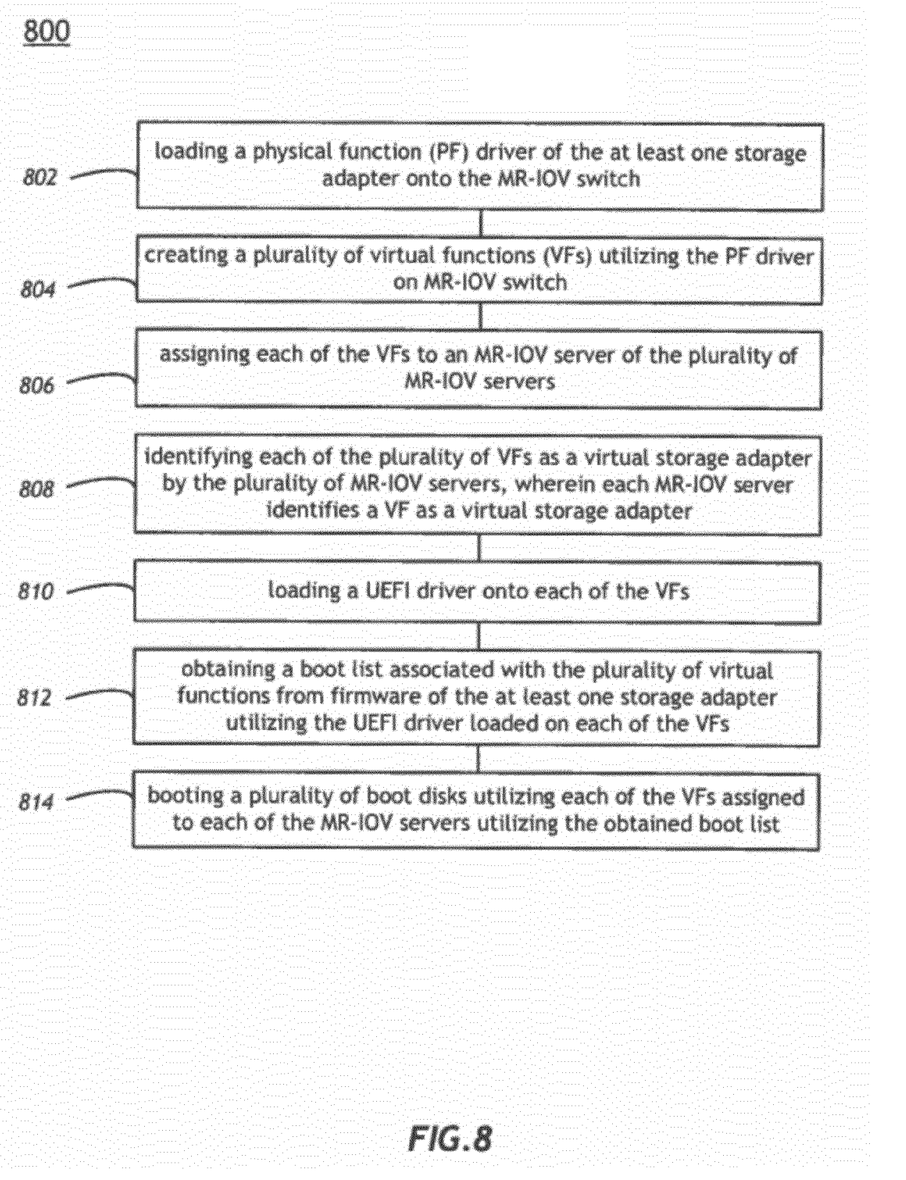
FIG. 8 illustrates a flow diagram depicting a process for VF function boot in a MR-IOV environment, in accordance with one embodiment of the present invention.

FIG. 8 illustrates a flow diagram depicting a process for VF function boot in a MR-IOV environment, in accordance with one embodiment of the present invention. Step 802 may load a physical function (PF) driver of the at least one storage adapter onto the MR-IOV switch. Step 804 may create a plurality of virtual functions (VFs) utilizing the PF driver on MR-IOV switch. Step 806 may assign each of the VFs to an MR-IOV server of the plurality of MR-IOV servers. Step 808 may identify each of the plurality of VFs as a virtual storage adapter by the plurality of MR-IOV servers, wherein each MR-IOV server identifies a VF as a virtual storage adapter. Step 810 may loading a UEFI driver onto each of the VFs. Step 812 may obtain a boot list associated with the plurality of virtual functions from firmware of the at least one storage adapter utilizing the UEFI driver loaded on each of the VFs, wherein the boot list is configured to associate each virtual function with a corresponding boot disk. Step 814 may boot a plurality of boot disks utilizing each of the VFs assigned to each of the MR-IOV servers utilizing the obtained boot list Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A method for virtual function boot in a system including a plurality of multi-root I/O virtualization (MR-IOV) servers, at least one MR-IOV switch, and at least one storage adapter including at least one physical function (PF) and configured to implement a plurality of virtual functions, each of the MR-IOV servers being communicatively coupled to the at least one MR-IOV switch, the at least one storage adapter being communicatively couplable to the at least one MR-IOV switch, comprising:

upon interconnection of the at least one storage adapter with the at least one MR-IOV switch, loading a physical function (PF) driver of the at least one storage adapter onto the MR-IOV switch;

creating a plurality of virtual functions (VFs) utilizing the PF driver on MR-IOV switch;

assigning each of the VFs to an MR-IOV server of the plurality of MR-IOV servers;

identifying each of the plurality of VFs as a virtual storage adapter by the plurality of MR-IOV servers, wherein each MR-IOV server identifies a VF as a virtual storage adapter;

loading a UEFI driver onto each of the VFs;

obtaining a boot list associated with the plurality of virtual functions from firmware of the at least one storage adapter utilizing the UEFI driver loaded on each of the VFs, wherein the boot list is configured to associate each virtual function with a corresponding boot disk; and booting a plurality of boot disks utilizing each of the VFs assigned to each of the MR-IOV servers utilizing the obtained boot list.

2. The method of claim 1, wherein the interconnection of the at least one storage adapter with the at least one MR-IOV switch comprises:

interconnecting the at least one storage adapter to the MR-IOV switch via a PCIe interconnecton bus.

3. The method of claim 1, wherein the storage adapter comprises:

a MegaRAID card.

4. The method of claim 1, wherein each of the MR-IOV servers is communicatively coupled to the at least one MR-IOV switch via a PCIe interconnection link.

5. The method of claim 1, wherein the loading a UEFI driver onto each of the VFs comprises:

loading a UEFI driver onto each of the VFs utilizing at least one of UEFI or BIOS.

6. The method of claim 1, further comprising:

providing a diagnostic message indicative of a status of at least one virtual function drivers.

7. The method of claim 6, wherein the providing a diagnostic message indicative of a status of at least one virtual function drivers comprises:

transmitting a status signal from the at least one virtual function driver to the at least one storage adapter, the status signal being indicative of the status of the at least one virtual function driver;

storing information associated with the status signal utilizing firmware of the at least one storage adapter;

relaying the status signal from the at least one storage adapter to the PF driver in the MR-IOV switch;

relaying the status signal from the PF driver to at least one of an error handler of the MR-IOV or management tool of the MR-IOV; and transmitting a user signal to a user interface from the management tool, wherein the user signal is configured to trigger a pre-determined message selected based on a characteristic of the status signal.

8. A system for virtual function boot in a system comprising:

at least one MR-IOV switch;

a plurality of multi-root I/O virtualization (MR-IOV) servers, each of the plurality of MR-IOV servers being communicatively coupled to the MR-IOV switch via a PCIe link; and at least one storage adapter including at least one physical function (PF), the at least one storage adapter configured to implement a plurality of virtual functions, the at least one storage adapter being communicatively couplable to the at least one MR-IOV switch via a PCIe slot of the MR-IOV switch, wherein, upon interconnection of the at least one storage adapter with the at least one MR-IOV switch, the at least one storage adapter, the MR-IOV switch, and the plurality of MR-IOV servers are configured to:

load a physical function (PF) driver of the at least one storage adapter onto the MR-IOV switch;

create plurality of virtual functions (VFs) utilizing the PF driver on MR-IOV switch;

assign each of the VFs to an MR-IOV server of the plurality of MR-IOV servers;

identify each of the plurality of VFs as a virtual storage adapter by the plurality of MR-IOV servers, wherein each MR-IOV server identifies a VF as a virtual storage adapter;

load a UEFI driver onto each of the VFs;

obtain a boot list associated with the plurality of virtual functions from firmware of the at least one storage adapter utilizing the UEFI driver loaded on each of the VFs, wherein the boot list is configured to associate each virtual function with a corresponding boot disk; and boot a plurality of boot disks utilizing each of the VFs assigned to each of the MR-IOV servers utilizing the obtained boot list.

9. The system of claim 8, wherein the MR-IOV switch is configured to perform multi-node clustering utilizing a single storage adapter, wherein a first virtual function is assigned to a first MR-IOV server and a second virtual function is assigned to at least a second MR-IOV server utilizing the MR-IOV switch.

10. The system of claim 8, wherein the at least one MR-IOV switch includes a first MR-IOV switch and a second MR-IOV switch configured to perform multi-node clustering utilizing two storage adapters, wherein a first virtual function from a first storage adapter is assigned to at least a first MR-IOV server utilizing the first MR-IOV switch and a second virtual function from a second storage adapter is assigned to the first MR-IOV server utilizing the second MR-IOV switch.

* * * * *